(No Model.)

C. H. DEANE.
HEADER.

No. 319,075. Patented June 2, 1885.

(No Model.) 2 Sheets—Sheet 2.

C. H. DEANE.
HEADER.

No. 319,075. Patented June 2, 1885.

Witnesses,
Geo. H. Strong.

Inventor,
C. H. Deane
By Dewey & Co.
attorneys

UNITED STATES PATENT OFFICE.

CHARLES H. DEANE, OF HOPETON, ASSIGNOR TO H. C. SHAW, OF STOCKTON, CALIFORNIA.

HEADER.

SPECIFICATION forming part of Letters Patent No. 319,075, dated June 2, 1885.

Application filed April 24, 1884. (No model.)

*To all whom it may concern:*

Be it known that I, CHARLES H. DEANE, of Hopeton, county of Merced, and State of California, have invented an Improvement in Harvesters; and I hereby declare the following to be a full, clear, and exact description thereof.

Figure 1:
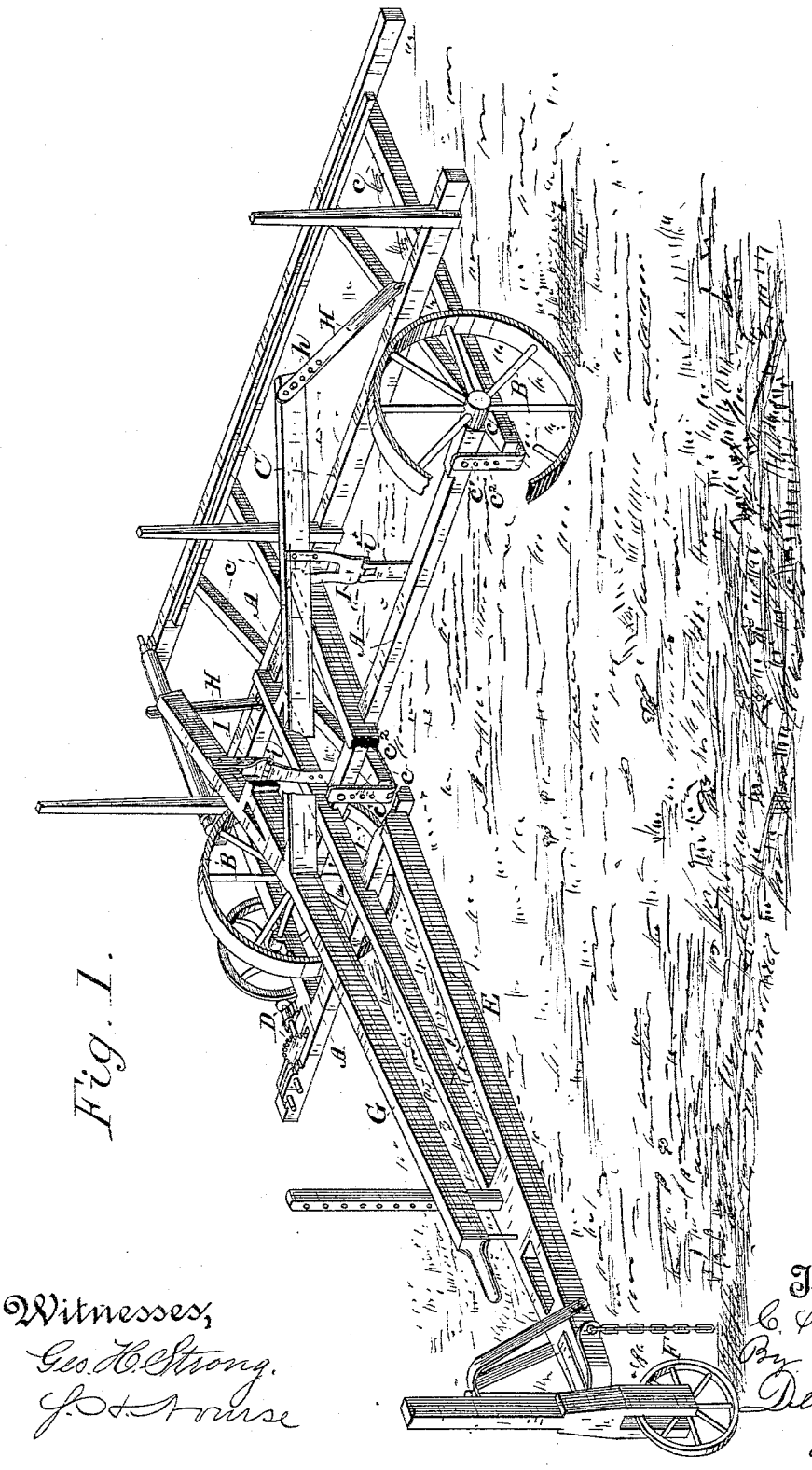
Figure 2:
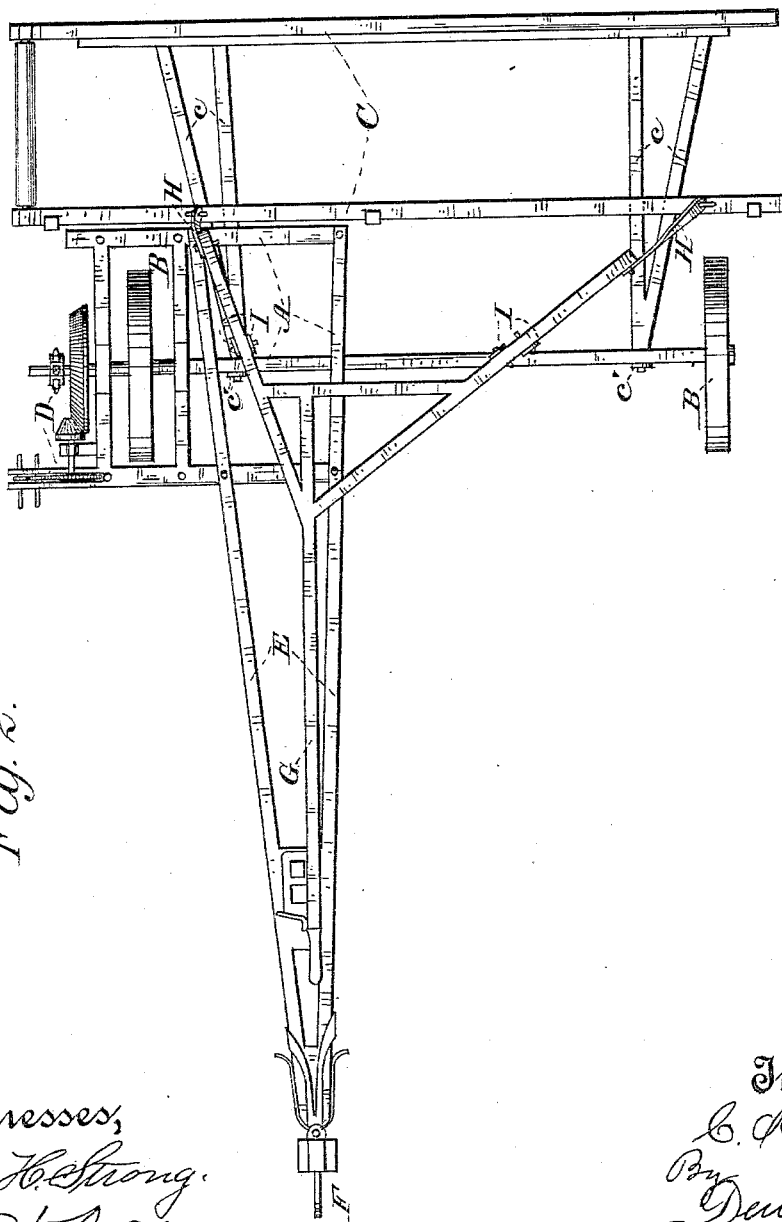

My invention relates to that class of agricultural implements known as "harvesters" or "headers," as one form is locally called.
My invention consists in certain new and useful improvements in headers, all of which I shall hereinafter claim, and fully explain by reference to the accompanying drawings, in which—
Figure 1 is a perspective view of my harvester. Fig. 2 is a top view.

The object of my invention is to provide a simple, effective, and easily-handled header.

A is the main frame, mounted on wheels B.
C is the draper and sickle carrying platform, having rearwardly-extending cross-arms $c$ passing under the main frame and hinged to its central bar or axle by the strap-hinges $c'$, whereby said platform may move on its hinged arms. The vertical arms of these hinges are provided with a series of holes, $c^2$, whereby they may be raised or lowered to vertically adjust the platform.

I have not herein shown the sickle, nor the draper, nor the spout, nor the connection by which motion is transmitted to the various parts from the gearing D, because these devices are well known and form no part of my invention.
E is the push-beam. This extends to the front of the main frame, and is secured solidly to it.

F is the steering-wheel.

G is the main lever. The forward end of this lever branches, and the ends of the branches are connected with the rear side of the draper-platform near each end by links H. The upper ends of the links are provided with a series of holes, $h$, whereby the point of connection between them and the lever G may be vertically adjusted to obtain more or less movement of the platform.

The lever G is fulcrumed on standards I secured to the main frame. These standards are hinged centrally at $i$, and the fulcrum or pivot point is the hinge. This construction which I use instead of a link pivoted at each end is advantageous in being stiffer and better adapted to steady the lever.

The essential novelty in my header is that the draper-platform has a movement independent of the main frame. It is usual to hinge the push-beam to the main frame, and form the draper-platform as a part of the frame. Then to adjust the sickle for a high or low cut the whole frame is moved on its wheels as a fulcrum; but in my machine the frame remains steady, and the draper-platform alone moves to an inclination. Therefore I need not hinge the push-beam to the main frame, but can secure it solidly thereto in the best manner possible, whereby I am enabled to make a firmer and stronger machine. Then, again, having nothing but the platform to adjust there is no great weight, and the lever can be operated easily, thus enabling me to dispense with springs and weights which are ordinarily used to assist the lever in turning the whole machine.

The object of forking the forward end of lever G is to afford good support to the platform.

If I wish to vary or alter the limits of movement of the platform, I raise it bodily and secure its hinges $c'$ higher up on the main frame, the holes $c^2$ in said hinges enabling me to do this; and by adjusting the links H, I can increase or diminish the inclination of the platform.

Having thus described my invention, what I claim as new, and desire to secure by Letters Patent, is—

1. In a header or harvester, the main wheeled frame A, in combination with the platform C, having arms $c$, hinged by vertically-adjusting hinges to the central bar or axle of the main frame, and a forked lever fulcrumed by a hinged connection on the main frame, and adjustably secured to the platform for supporting and turning said platform to an inclination, substantially as herein described.

2. In a header or harvester, the main wheeled frame, in combination with the platform having arms $c$, the vertically-adjustable strap-hinges $c'$, connecting said arms with the main frame, and means for supporting and turning the platform to an inclination, substantially as herein described.

3. In a header or harvester, the platform C, having arms c, hinged to the main wheeled frame by adjusting-hinges, in combination with the lever G, fulcrumed on the main frame, and having a branching or forked forward end, and the perforated links H, connecting the ends of its branches directly with the platform, substantially as herein described.

4. The platform C, hinged to the main frame by adjustable strap-hinges, in combination with the forked lever G, the hinged fulcrum-standards I, secured to the axle, and the adjustable connecting-links H, attached directly to the platform, substantially as and for the purpose herein described.

In witness whereof I have hereunto set my hand.

CHARLES H. DEANE.

Witnesses:
W. D. NELSON,
J. A. HANNELSON.